US006241274B1

(12) United States Patent
Huang

(10) Patent No.: US 6,241,274 B1
(45) Date of Patent: Jun. 5, 2001

(54) SECURITY DEVICE FOR A FOLDABLE TOY STROLLER

(76) Inventor: Ming-Tai Huang, 4th Fl., No. 302, Sec. 7, Chengteh Rd., Taipei (TW)

( * ) Notice: Subject to any disclaimer, the term of this patent is extended or adjusted under 35 U.S.C. 154(b) by 0 days.

(21) Appl. No.: 09/228,770

(22) Filed: Jan. 6, 1999

(51) Int. Cl.$^7$ ...................................................... B62B 7/06
(52) U.S. Cl. ............................................ 280/642; 280/647
(58) Field of Search ...................................... 280/639, 641, 280/642, 647, 650, 654, 657, 658, 47.38, 47.4; 446/268, 269; 297/256.16

(56) References Cited

U.S. PATENT DOCUMENTS

| 2,972,488 | * | 2/1961 | Alsop | 280/647 |
| 3,184,261 | * | 5/1965 | Young | 280/639 |
| 4,506,906 | * | 3/1985 | Alldén | 280/650 |
| 4,542,915 | * | 9/1985 | Wheeler, III et al. | 280/650 |
| 4,836,573 | * | 6/1989 | Gebhard | 280/47.38 |
| 4,997,154 | * | 3/1991 | Little | 279/647 |
| 5,388,853 | * | 2/1995 | Lauro | 280/658 |
| 5,478,102 | * | 12/1995 | Haung | 280/650 |
| 5,605,409 | * | 2/1997 | Haut et al. | 280/650 |
| 5,772,279 | * | 6/1998 | Johnson, Jr. | 297/256.16 |
| 5,865,447 | * | 2/1999 | Huang | 297/256.16 |
| 5,979,928 | * | 11/1999 | Kuo | 280/642 |
| 6,059,302 | * | 5/2000 | Huang | 280/657 |

FOREIGN PATENT DOCUMENTS

| 2204282 | * | 11/1988 | (GB) | 280/47.38 |
| 2254587 | * | 10/1992 | (GB) | 280/47.38 |

* cited by examiner

Primary Examiner—Frank Vanaman
(74) Attorney, Agent, or Firm—Kolisch Hartwell Dickinson McCormack & Heuser

(57) ABSTRACT

A security device of a toy stroller includes two bodies each having two passages to respectively receive the upper frame and the lower frame of the toy stroller. Two engaging members of a seat are respectively mounted to the upper frame and adjacent to the two bodies so as to limit the bodies from being moved along the upper frame to disengage from the lower frame such that the upper frame and the lower frame can not be folded relative to each other.

1 Claim, 4 Drawing Sheets

SECURITY DEVICE FOR A FOLDABLE TOY STROLLER

FIELD OF THE INVENTION

The present invention relates to a toy stroller, and more particularly, to a foldable toy stroller having a security device for preventing the toy stroller from folding unintentionally. The security device connects the upper frame and the lower frame, and cooperates with a seat mounted to the frame so that the security device cannot be moved to allow the toy stroller to be folded unless the seat is removed from the frame.

BACKGROUND OF THE INVENTION

Generally, a conventional toy stroller is required to be foldable, and this can be achieved by hinges that foldably connect the U-shaped upper frame and the U-shaped lower frame. The upper frame is pivotably connected to two rear frames which have two rear wheels connected thereto, and the lower frame has at least one front wheel connected thereto. A seat with a hood is connected between the two sides of the lower frame. The hinges are designed to be foldable so as to fold the upper frame relative to the lower frame to reduce the space occupied by the toy stroller. Basically, the foldable hinges are equipped with a stop means, which has to be operated before the toy stroller is folded. However, the authorities of most countries require the toy stroller to have a security device to prevent the toy stroller from folding unintentionally so that the manufacturers add various types of security devices to the upper frame or the lower frame. This complicates the structure of the toy stroller and increases the manufacturing cost. In addition, children playing with the toy stroller have to operate the stop means and the security device, and the two procedures could reduce the interest to children.

The present invention intends to provide a toy stroller which has a seat having two engaging members which are mounted to the frame of the stroller and abut the hinges to limit the hinges from being moved so that the frames of the toy stroller will not be folded unintentionally.

The present invention has arisen to mitigate and/or obviate the disadvantage of the conventional foldable toy stroller.

SUMMARY OF THE INVENTION

In accordance with one aspect of the present invention, there is provided a security device for a foldable toy stroller which has a U-shaped upper frame and a U-shaped lower frame which is pivotally connected to the upper frame by two first hinges, and the rear frame is pivotably connected to the upper frame by two second hinges. The security device comprises two respective bodies each with a first passage to receive one side of the lower frame and a second passage to receive one side of the upper frame. Each of the bodies is located between the first hinge and the second hinge corresponding thereto.

Two engaging members are connected to the seat and mounted to the upper frame, and the two engaging members are respectively located between the body and the second hinge to limit the body's movement.

The object of the present invention is to provide a security device, which connects the upper frame and the lower frame, and is stopped from being disengaged from the lower frame by the engaging members of the seat mounted to the upper frame.

Another object of the present invention is to provide a security device, which can be released to fold the toy stroller by disengaging the seat from the frame of the stroller.

Further objects, advantages, and features of the present invention will become apparent from the following detailed description with appropriate reference to the accompanying drawings.

DETAILED DESCRIPTION OF THE PREFERRED EMBODIMENT

Figure 1:
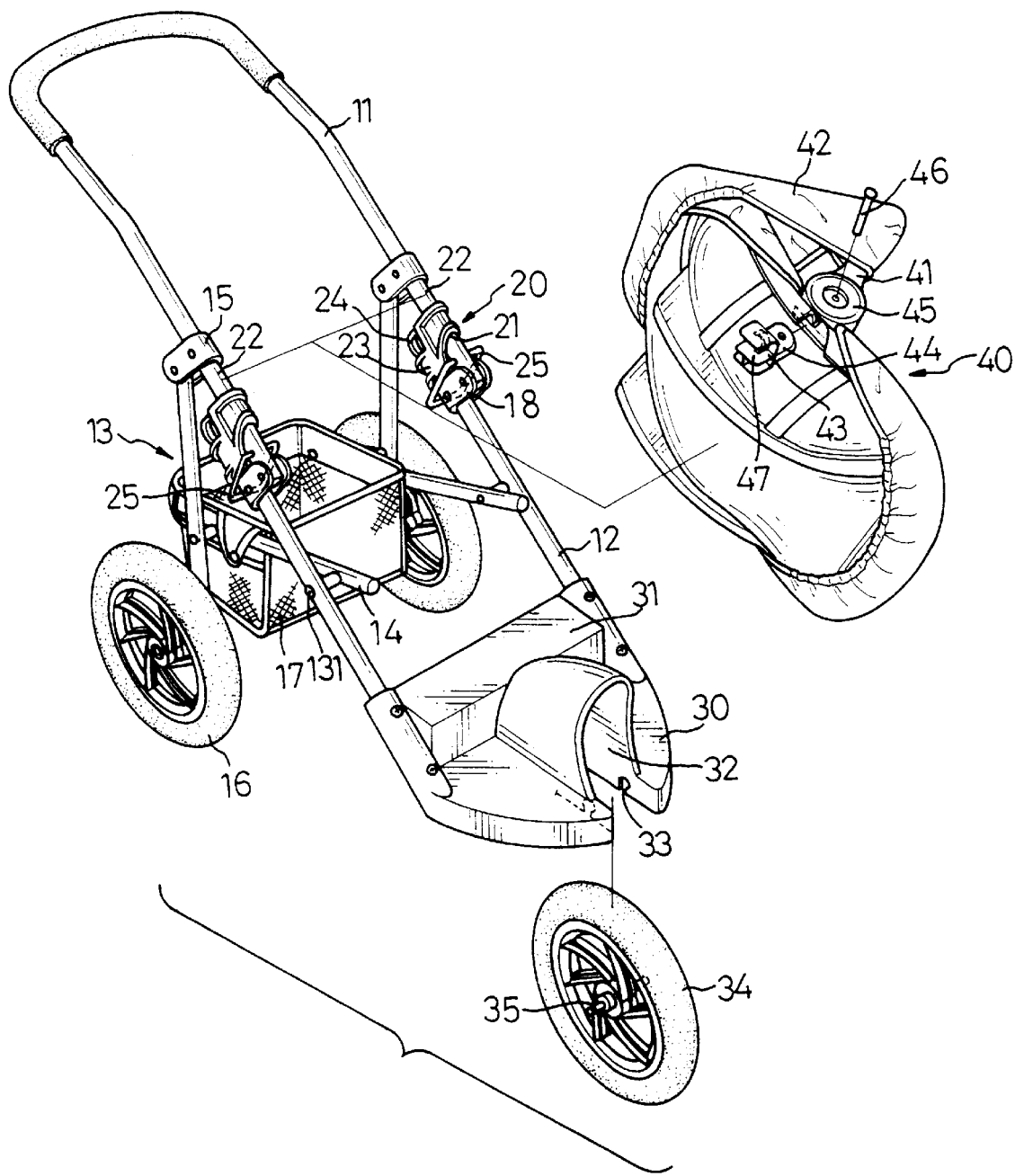
FIG. 1 is an exploded perspective view of the security device in accordance with the present invention and the toy stroller.
Figure 2:
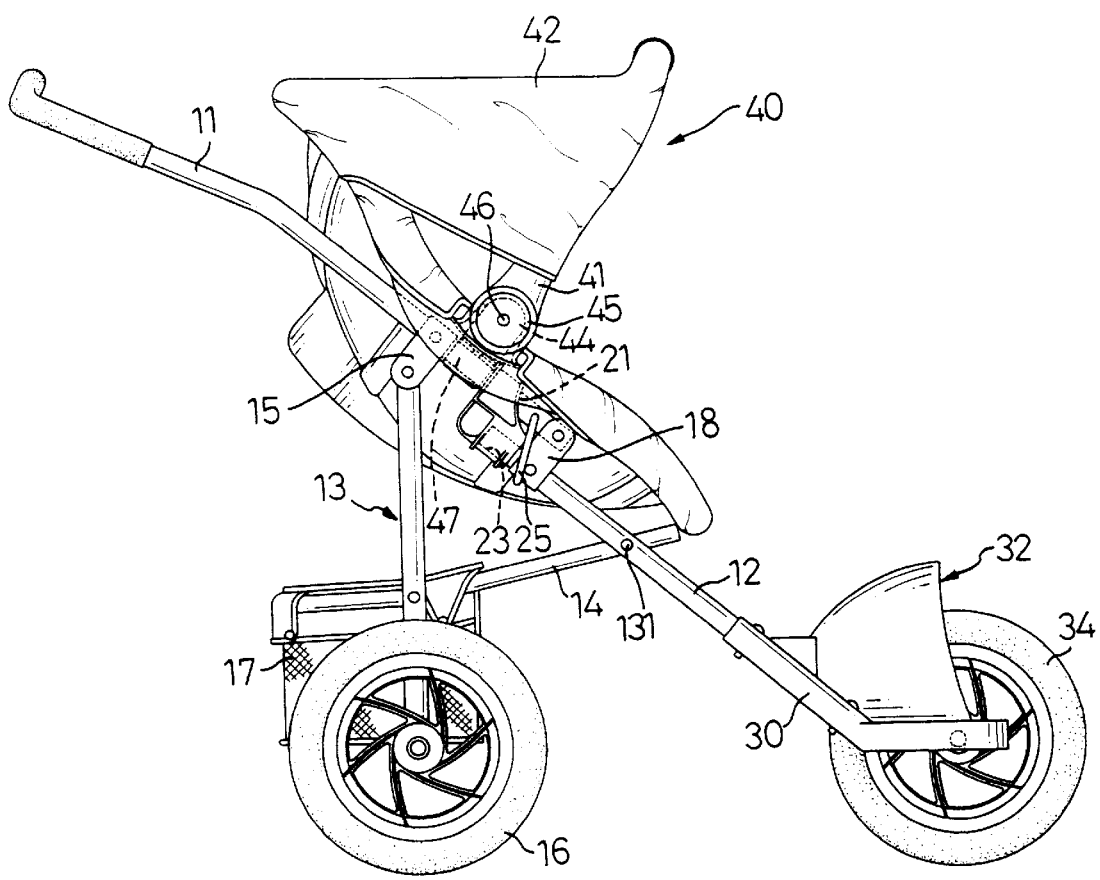
FIG. 2 is a side elevational view to show the toy stroller with the seat mounted to the frame so that the upper frame and the lower frame cannot be folded.

Referring to FIGS. 1 and 2, a foldable toy stroller has a U-shaped upper frame (11) and a U-shaped lower frame (12) which is pivotally connected to the upper frame (11) by two first hinges (18) so that the upper frame (11) is able to be folded relative to the lower frame (12) about the two first hinges (18). A rear frame (13) is pivotably connected to the upper frame (11) and the lower frame (12) respectively by two second hinges (15) and two pins (131). A basket (17) is connected between the two side rods (14) of the rear frame (13) and two rear wheels (16) are connected to the rear frame (13). A front frame (30) is connected between the two sides of the lower frame (12) and includes a step (31) and a fender (32) in which the front wheel (34) is received by inserting two ends of the shaft (35) of the front wheel (34) into the two engaging slots (33) defined in the two sides of the fender (32).

A seat (40) has a handle (41) pivotably connected to the base portion of the seat (40) and a hood (42) is removably mounted to the handle (41) and the base portion of the seat (40). Two engaging members (43) are connected to two ends (45) of the handle (41) by extending two pins (46) through the two ends (45) of the handle (41) and the two respective connecting plates (44) of the engaging members (43). Each of the two engaging members (43) has an inverted U-shaped member (47) which can be securely mounted to the upper frame (11).

The security device in accordance with the present invention comprises two respective bodies (20) each have a first passage (23) to receive one side of the lower frame (12) and a second passage (21) to receive one side of the upper frame (11) so that the upper frame (11) and the lower frame (12) cannot be folded with each other. Each of the bodies (20) are located between the first hinge (18) and the second hinge (15) corresponding thereto. That is to say, a section (22) of the upper frame (11) is defined between each of the body (20) and the second hinges (15) for the engaging members

(43) to be mounted on. The two engaging members (43) are located adjacent to the two bodies (20) so that the two bodies (20) are limited by the first hinges (18) and the engaging members (43) from moving along either the upper frame (11) or the lower frame (12). Two U-shaped limit members (25) are respectively and pivotally attached to the upper frame (11) so that the U-shaped limit members (25) can be pivoted about the pivoting axis in the upper frame (11). The lower portion of each of the two limit members (25) disengagably embraces the first hinge (18) corresponding thereto so as to further limit the relative movement between the upper frame (11) and the lower frame (10).

Figure 3:
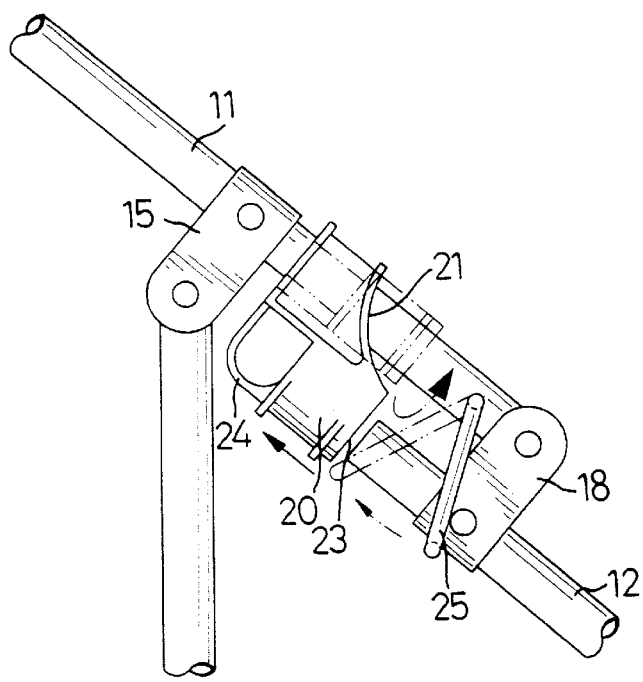
FIG. 3 is an illustrative view to show the body of the security device in accordance with the present invention moved along the upper frame to disengage from the lower frame.
Figure 4:
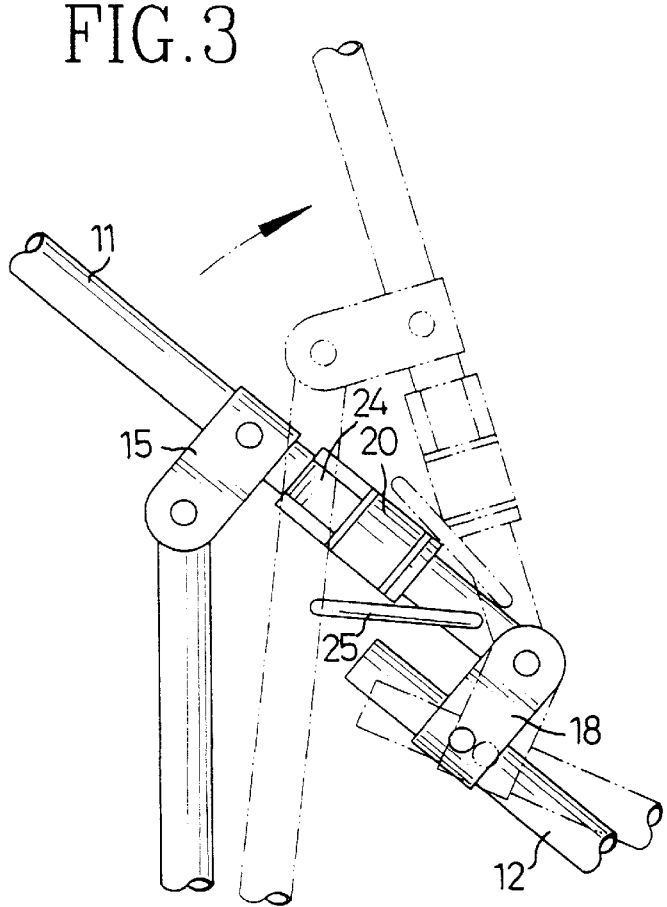
FIG. 4 is an illustrative view to show the body of the security device in accordance with the present invention moved along the upper frame to disengage from the lower frame and rotated, and the upper frame pivoted relative to the lower frame.
Figure 5:
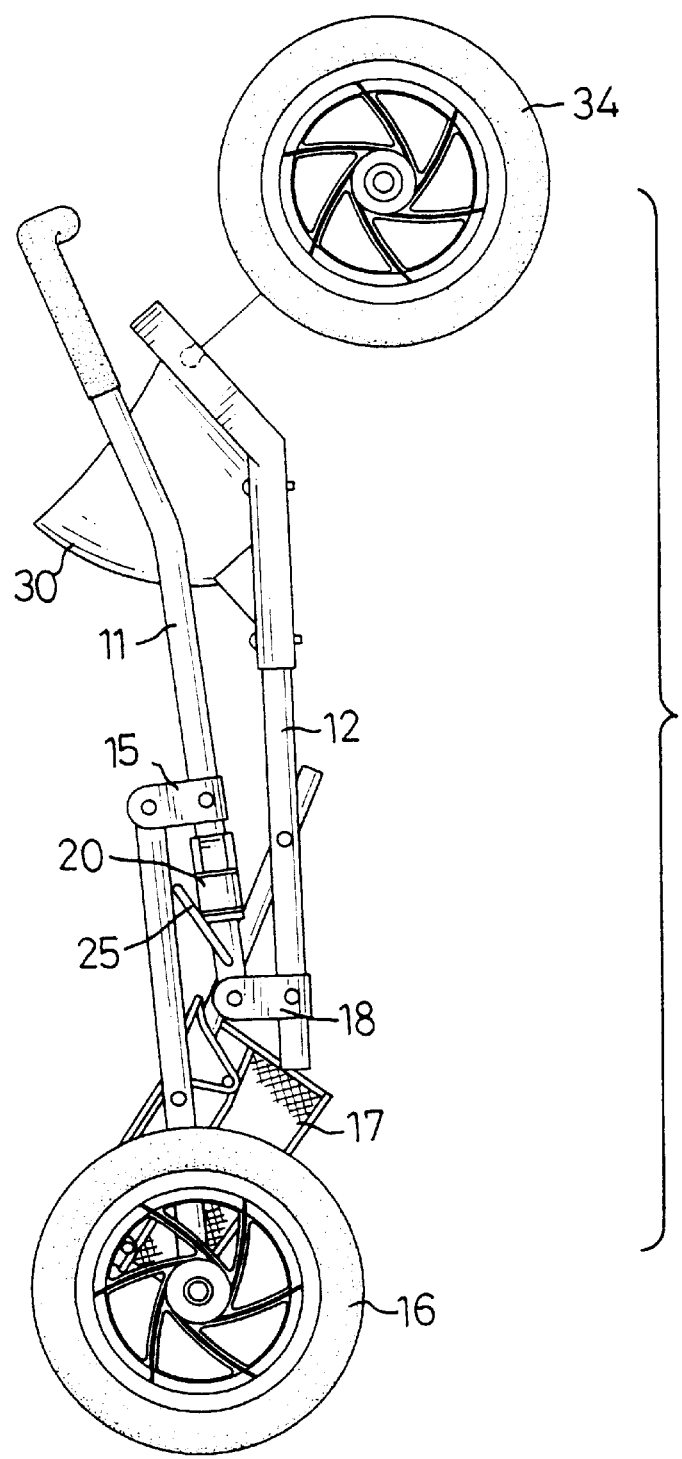
FIG. 5 is a side elevational view to show the folded toy stroller.

Referring to FIGS. 3 and 4, when folding the toy stroller, the seat (40) is disengaged from the upper frame (11) and the bodies (20) are moved along the upper frame (11) toward the second hinges (15) to disengage the lower frame (12) from the first passages (23) of the two bodies (20). The two U-shaped limit members (25) are then pivoted to remove them from the two first hinges (18) as shown in FIG. 3. The bodies (20) are then rotated about the upper frame (11) so as not to contact the rear frame (13) when folding the upper frame (11) together with the rear frame (13) relative to the lower frame (12) as shown in FIGS. 4 and 5. Each of the bodies (20) has a ring (24) connected to the top thereof so as to conveniently pull the bodies (20) toward the second hinges (15). As shown in FIG. 5, the front wheel (34) can easily to be disengaged from the front frame (30) by pulling the shaft (35) from the engaging slots (33). By the present invention, the toy stroller can be easily folded and the two engaging members (43) of the seat (40) perform as the security device so that it is not necessary to add an additional security device to the toy stroller. The two U-shaped limit members (25) perform as a second security device before folding the stroller.

Although the invention has been explained in relation to its preferred embodiment, it is to be understood that many other possible modifications and variations can be made without departing from the spirit and scope of the invention as hereinafter claimed.

What is claimed is:

1. A security device for a foldably toy stroller which has a U-shaped upper frame and a U-shaped lower frame which is pivotally connected to said upper frame by two first hinges, a rear frame pivotably connected to the upper frame by two second hinges, at least one front wheel connected to the lower frame, two rear wheels connected to said rear frame, and a seat connected to said upper frame, said security device comprising:

two respective bodies, each having a ring connected to a top thereof, a first passage adapted to receive one side of the lower frame and a second passage adapted to be located between said first hinge and said second hinge;

two U-shaped limit members respectively and pivotally attached to said upper frame, said two limit members releasably engaging said two first hinges; and two engaging members adapted to be connected to the seat and mounted to the upper frame, said two engaging members each respectively adapted to be located between one of said bodies and one of said second hinges to limit said bodies from being moved;

wherein each of said bodies is suitable to rotate on the upper frame when said bodies are adapted to disengage from the lower frame.

* * * * *